United States Patent [19]

Kates

[11] Patent Number: 5,355,077
[45] Date of Patent: Oct. 11, 1994

[54] HIGH EFFICIENCY REGULATOR WITH SHOOT-THROUGH CURRENT LIMITING

[75] Inventor: Barry K. Kates, Austin, Tex.

[73] Assignee: Dell U.S.A., L.P., Austin, Tex.

[21] Appl. No.: 874,143

[22] Filed: Apr. 27, 1992

[51] Int. Cl.[5] .............................................. G05F 1/613
[52] U.S. Cl. ................................. 323/224; 323/271;
                                           323/283; 323/288
[58] Field of Search ............... 323/222, 224, 282, 283,
                                       323/288, 351, 271, 272

[56] References Cited

U.S. PATENT DOCUMENTS

| | | | |
|---|---|---|---|
| 4,161,023 | 7/1979 | Goffeau | 323/224 |
| 4,538,101 | 8/1985 | Shimpo et al. | 323/272 |
| 4,672,303 | 6/1987 | Newton | 323/288 |
| 4,801,859 | 1/1989 | Dishner | 323/222 |
| 4,825,144 | 4/1989 | Alberkrack et al. | 323/272 |
| 4,931,716 | 6/1990 | Jovanovic et al. | 323/224 |
| 5,066,900 | 11/1991 | Bassett | 232/222 |
| 5,072,171 | 12/1991 | Eng | 323/283 |
| 5,097,196 | 3/1992 | Schoneman | 323/224 |
| 5,128,603 | 7/1992 | Wolfel | 323/282 |
| 5,130,561 | 7/1992 | Elliott et al. | 323/272 |
| 5,138,249 | 8/1992 | Capel | 323/283 |
| 5,142,217 | 8/1992 | Gontowski | 323/272 |

Primary Examiner—Jeffrey L. Sterrett
Attorney, Agent, or Firm—Robert Groover; James Huffman

[57] ABSTRACT

Regulator with small dropout voltage and high efficiency utilizes pass and free-wheeling field effect transistors having intercouplings to limit shoot through currents during switching.

22 Claims, 17 Drawing Sheets

HIGH EFFICIENCY REGULATOR WITH SHOOT-THROUGH CURRENT LIMITING

PARTIAL WAIVER OF COPYRIGHT PURSUANT TO 1077 O.G. 22 (Mar. 20, 1987)

All of the material in this patent application is subject to copyright protection under the copyright laws of the United States and of other countries. As of the first effective filing date of the present application, this material is protected as unpublished material.

Portions of the material in the specification and drawings of this patent application are also subject to protection under the maskwork registration laws of the United States and of other countries.

However, permission to copy this material is hereby granted to the extent that the owner of the copyright and maskwork rights has no objection to the facsimile reproduction by anyone of the patent document or patent disclosure, as it appears in the United States Patent and Trademark Office patent file or records, but otherwise reserves all copyright and maskwork rights whatsoever.

BACKGROUND AND SUMMARY OF THE INVENTION

The present invention relates to electronic devices, and, more particularly, to power supply and control as may used in portable computer systems.

Laptop and Smaller Computers

Portable personal computers were introduced in the early 1980s and proved to be very useful and popular. As this market has developed, it has become increasingly clear that users strongly desire systems to have small volume, small weight, physical durability, and long battery-powered lifetime. Thus, small portable computers ("laptop" computers) proved to be extremely popular during the late 1980s. Users continue to demand more features, longer time between battery recharges, and lower weight and volume. This combination of demands is difficult to meet. Moreover, as of 1990, another smaller generation of portable computers has begun to appear, referred to as "notebook" computers. This smaller form factor will only exacerbate the difficulty of the above tradeoffs.

Approaches to Power Conservation

There are basic approaches to extending the operating lifetime of a portable computer. The simplest way is to specify components at the lowest economical power consumption. Thus, for instance, CMOS integrated circuits and liquid crystal displays (LCDs) will normally be used.

An equally simple way is to increase battery capacity. However, both of these routes rapidly encounter limits, which are set simply by the tradeoff of the cost of lower-power components, or of the elimination of functionality, with user expectations.

Another approach focusses on the conversion efficiency of the battery power to the regulated AC and DC power actually consumed by the computer components.

And a fourth way invokes power-management algorithms so that, at almost every instant, all components are being operated in the lowest-power mode for their current demands. Thus, for example, a processor which is not currently executing a program may be placed into "sleep" mode, to reduce its overall power consumption. For another example, substantial power savings can be achieved simply by stopping the system clock.

All of these lines of approach have some inherent limits. For example, it is hard to foresee any integrated circuit technology which would be economical in the 1990s and more power-efficient than low-power low-voltage CMOS. Some further improvement in this area is foreseeable, but no revolutionary improvements appear likely. Moreover, in practice, such improvements are largely outside the control of system designers: when lower-power chips are sampled, system design houses will buy them; but system design houses cannot greatly accelerate the pace of introduction of such chips.

It is also true that the smartest power-management programs cannot reduce the time fraction during which the user wishes to look at the display, or enter data through the keyboard. However, in this area there does appear to be room for improvement, and system design improvements can help achieve power efficiency.

Many power management schemes have been proposed, where parts of the system are shut down during periods of inactivity. These approaches tend to extend the usable working time between recharges.

In addition, it has been recognized that management of the charging and discharging cycles of NiCd or $NiMH_4$ batteries can help to extend their life.

Either of these power-management functions requires some intelligent control. The conventional way to implement this has been using the main microprocessor (CPU). To accomplish this, the necessary program steps are inserted into the BIOS software (basic input/output system software), which is stored in ROM.

Power Consumption

FIG. 1 illustrates in perspective view a notebook type portable computer system labelled with reference numeral 100. System 100 typically has a seven volt main battery made of six 1.2 volt rechargeable nickel-cadmium cells in series and battery power manager for supplying the various power needs, such as 3.3 and 5 volts regulated DC for CMOS devices, 12 volts regulated DC for Flash EEPROM programming, and high voltage AC for the backlightling lamps of the LCD screen.

Thus the system typically includes various DC to DC regulators (converters) and a DC to AC inverter. For example, the 5 volt regulator may have a specification such as: provide a regulated 5 volt output of up to 5 amps from an input in a range such as 7 to 25 volts. FIG. 2A schematically shows a known 5 volt regulator. In addition to high efficiency (for long battery life), the regulator should deliver a steady, regulated DC voltage with a small dropout voltage; that is, the unregulated input voltage need only be slightly larger than the output regulated voltage for proper operation. However, known low voltage regulators only achieve moderate efficiencies for small dropout voltages. Generally, see Pressman, Switching Power Supply Design (McGraw-Hill 1991).

Known Regulators

Prior art regulator 200 of FIG. 2A takes battery 210 as input power at voltage $V_{in}$ and outputs power at regulated voltage $V_{out}$; the regulation derives from the feedback of $V_{out}$ to controller 220. Regulator 200 operates basically as follows: controller 220 includes an oscillator to drive the gates of n-channel field effect transistors (FETs) 222 and 224 with the output feedback determining the duty cycle of the drive; see the first two panels of FIG. 2B. When pass FET 222 is turned on (and free-wheeling FET 224 off) current flows in a loop through battery 210, inductor 232, and load 240 (and capacitor 234) with the current increasing to provide a drop ($V_{in} - V_{out}$) across inductor 232; see the rising current portions of the third panel of FIG. 2B. Node 230 is at $V_{in}$ when pass FET 222 is turned on. Next, controller 220 turns off pass FET 222 and turns on free-wheeling FET 224. This breaks the current loop through batten 210; but the collapsing field of inductor 232 maintains $V_{out}$ and supplies current for a loop through inductor 232, load 240, and free-wheeling FET 224 plus Schottky diode 236. Note that the voltage at node 230 flys back to about 0.4 volt below ground to turn on diode 236 if free-wheeling FET 224 has not yet turned on; see the bottom panel of FIG. 2B. In fact, free-wheeling FET 224 lessens losses that the use of diode 236 alone would generate: when conducting diode 236 has a 0.3-0.4. volt drop, whereas turned-on free-wheeling FET 224 will only have a 0.1-0.2 volt drop. Controller 220 sets $V_{out}$ by varying the duty cycle of FETs 222 and 224. Indeed, $V_{out}$ equals $V_{in}$ multiplied by the duty cycle of pass FET 222 if losses are ignored. Inductor 232 and capacitor 234 form a low pass filter for $V_{out}$, so if the oscillator of controller 220 has a high enough frequency, $V_{out}$ will have essentially no harmonics.

Known regulators 200 have problems including a lack of efficiency in extracting power from a battery input with a battery voltage not much above the regulated output voltage (a large dropout voltage at high currents). Thus known regulators have required excess battery input voltage (i.e., using six rather than five 1.2 volt cells in series for the standard 5 volt output) or not fully utilizing the battery energy and requiring more frequent replacement than necessary. The use of six rather than five cells increases battery weight which limits portability. Further, if free-wheeling FET 224 turns on before pass FET 222 turns off, or vice versa, a large transient "shoot through" current can flow directly from battery. 210 to ground. Such shoot through can occur when the gate capacitances of the FETs leads to simultaneous turn on.

Features

The present invention provides a reglator with small dropout voltage (0.3 volts at 5 amps) and minimal shoot through current by use of an adaptive synchronous recitifier.

BRIEF DESCRIPTION OF THE DRAWINGS

The present invention will be described with reference to the accompanying drawings which are schematic for clarity.

DESCRIPTION OF THE PREFERRED EMBODIMENTS

Overview

Figure 3A:
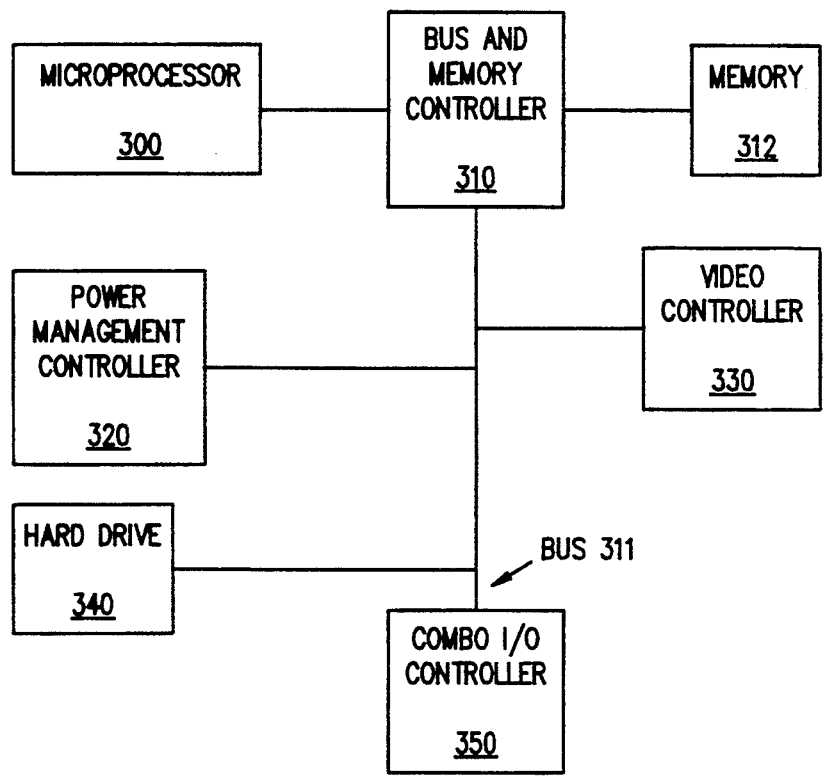
FIGS. 3A-E are schematic circuit block diagrams of a first preferred embodiment system.

FIG. 3A is a schematic block diagram of a first preferred embodiment portable computer system which includes microprocessor 300, bus and memory controller 310, bus 311, memory 312, power consumption management 320, video controller 330, hard disk drive 340, and input/output controller 350.

Figure 3B:
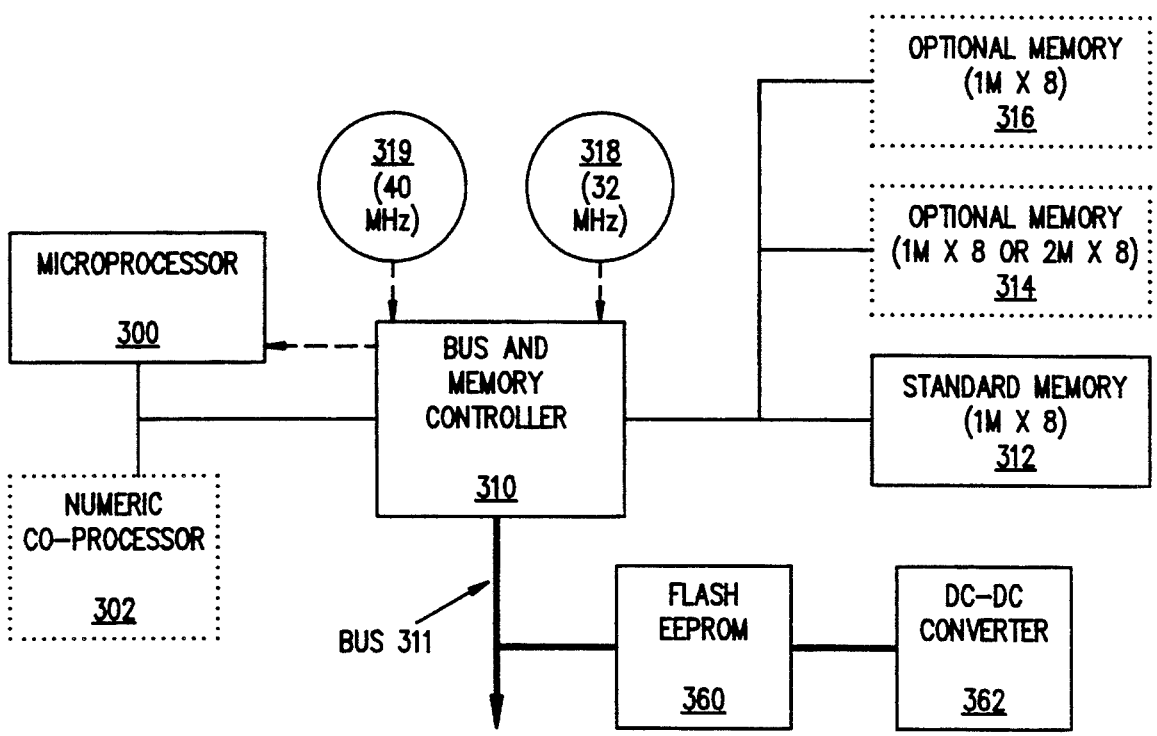
Figure 3C:
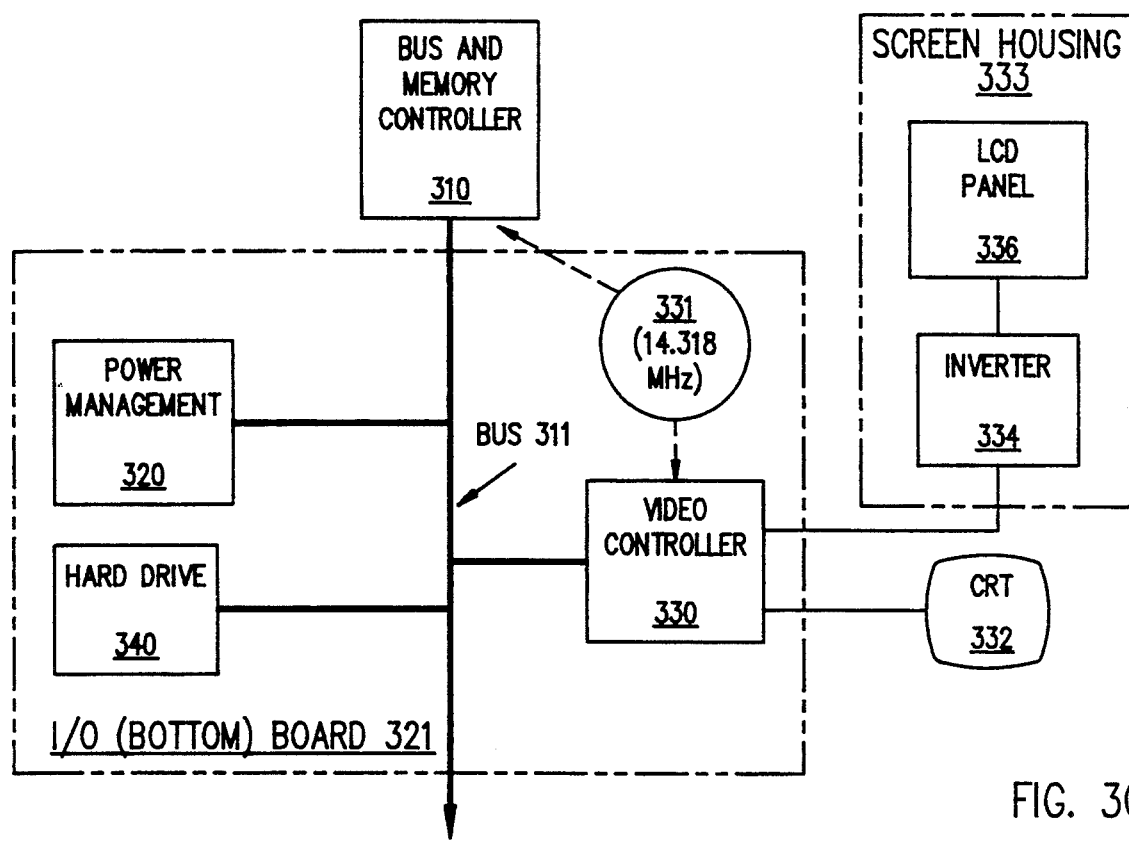
Figure 3D:
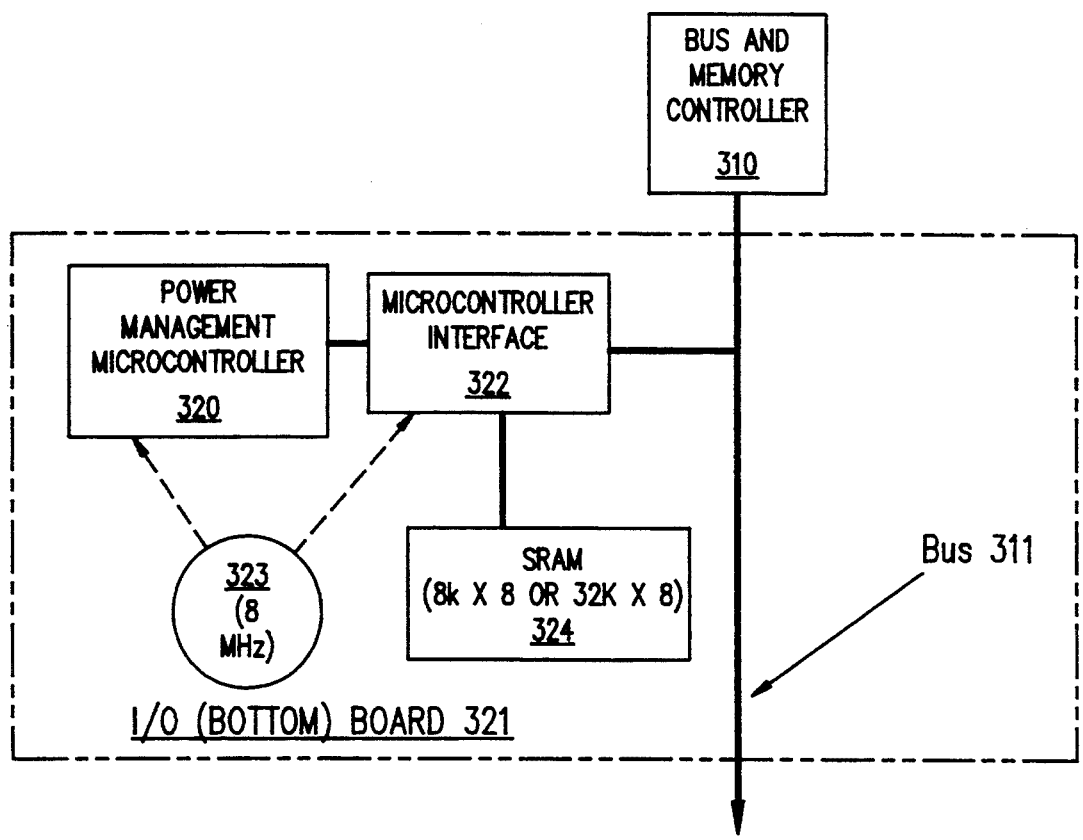
Figure 3E:
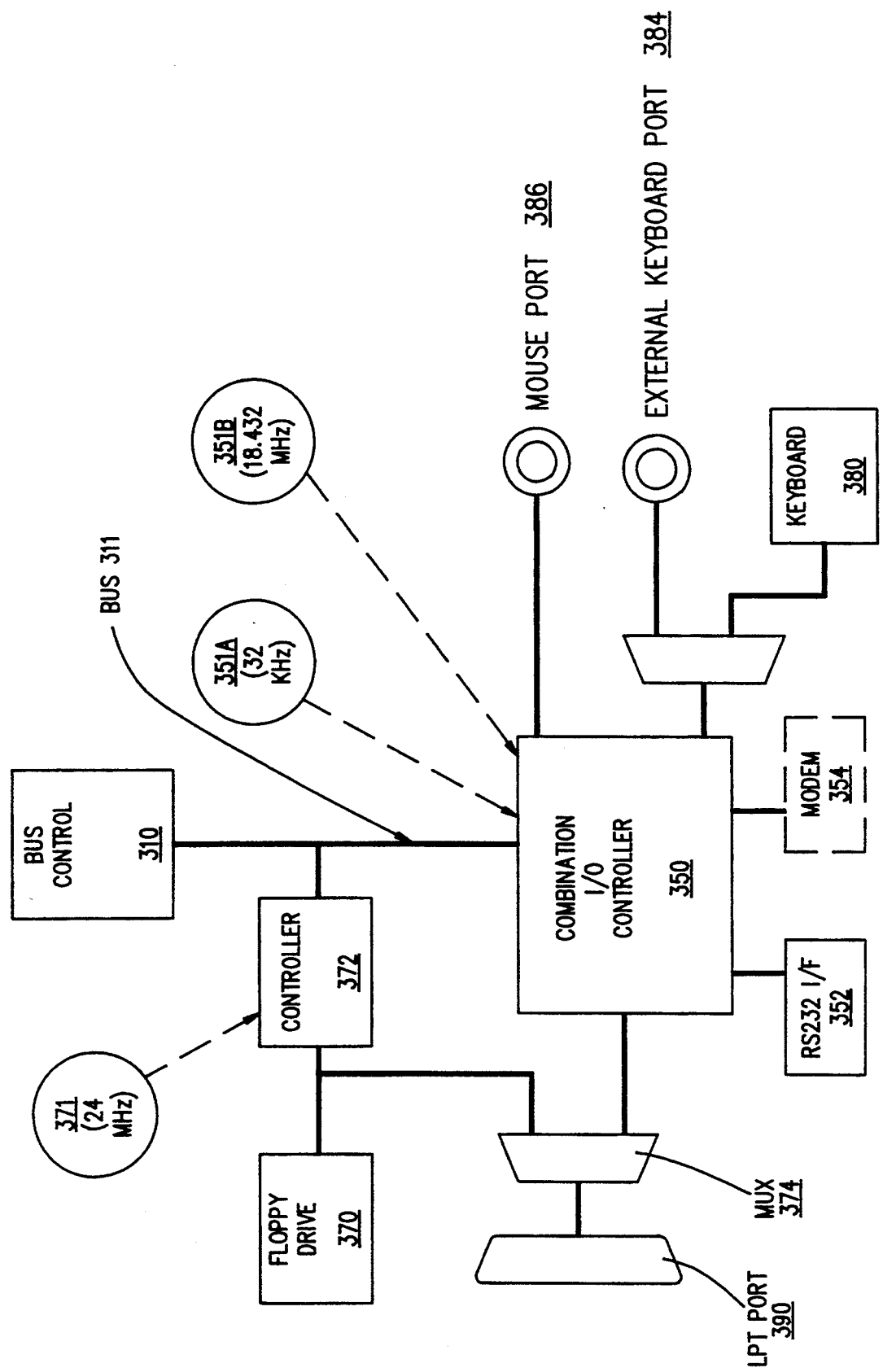
Figure 4A:
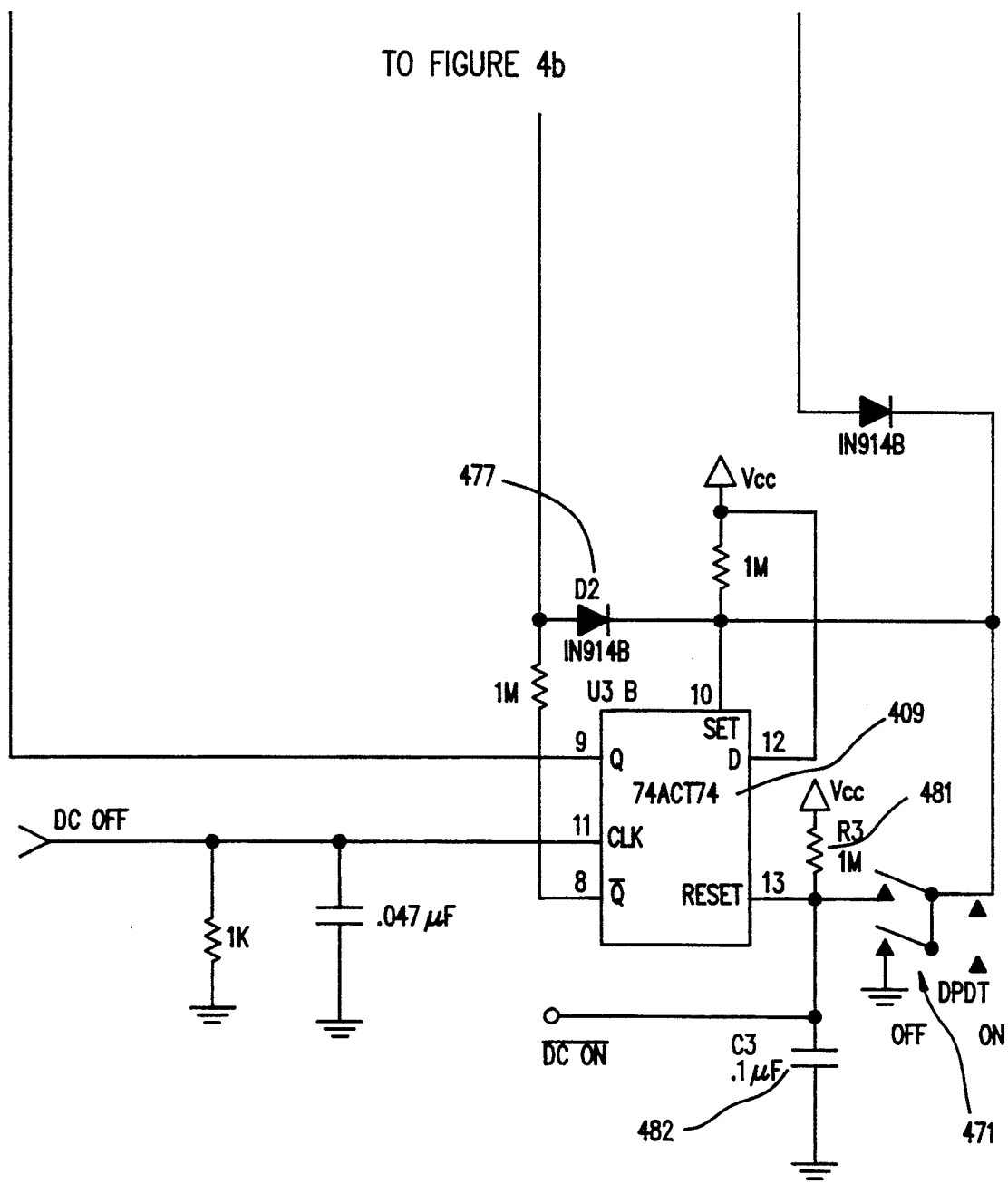
FIG. 4 a schematic circuit diagram of a the first preferred embodiment regulator.
Figure 4B:
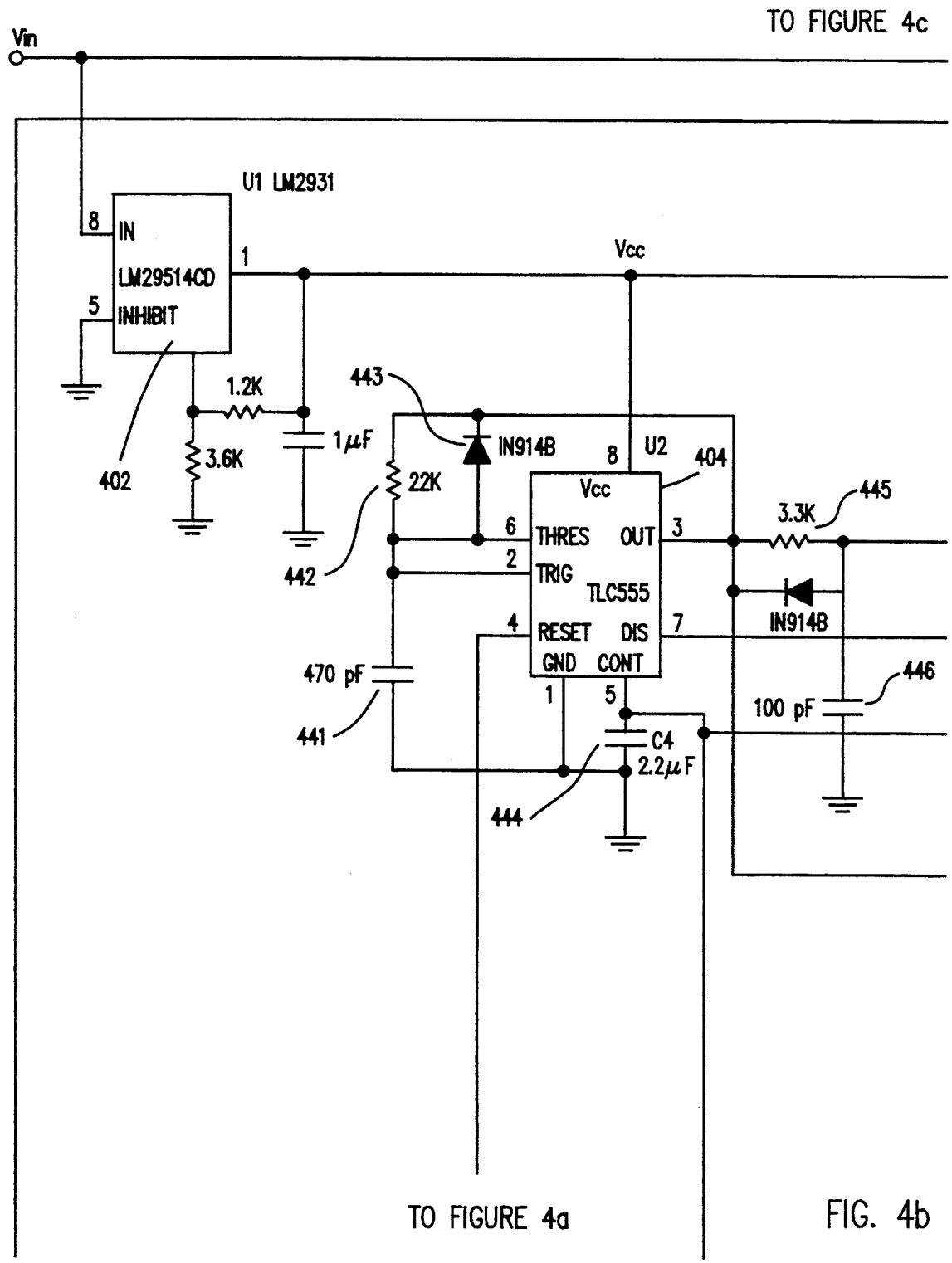
Figure 4C:
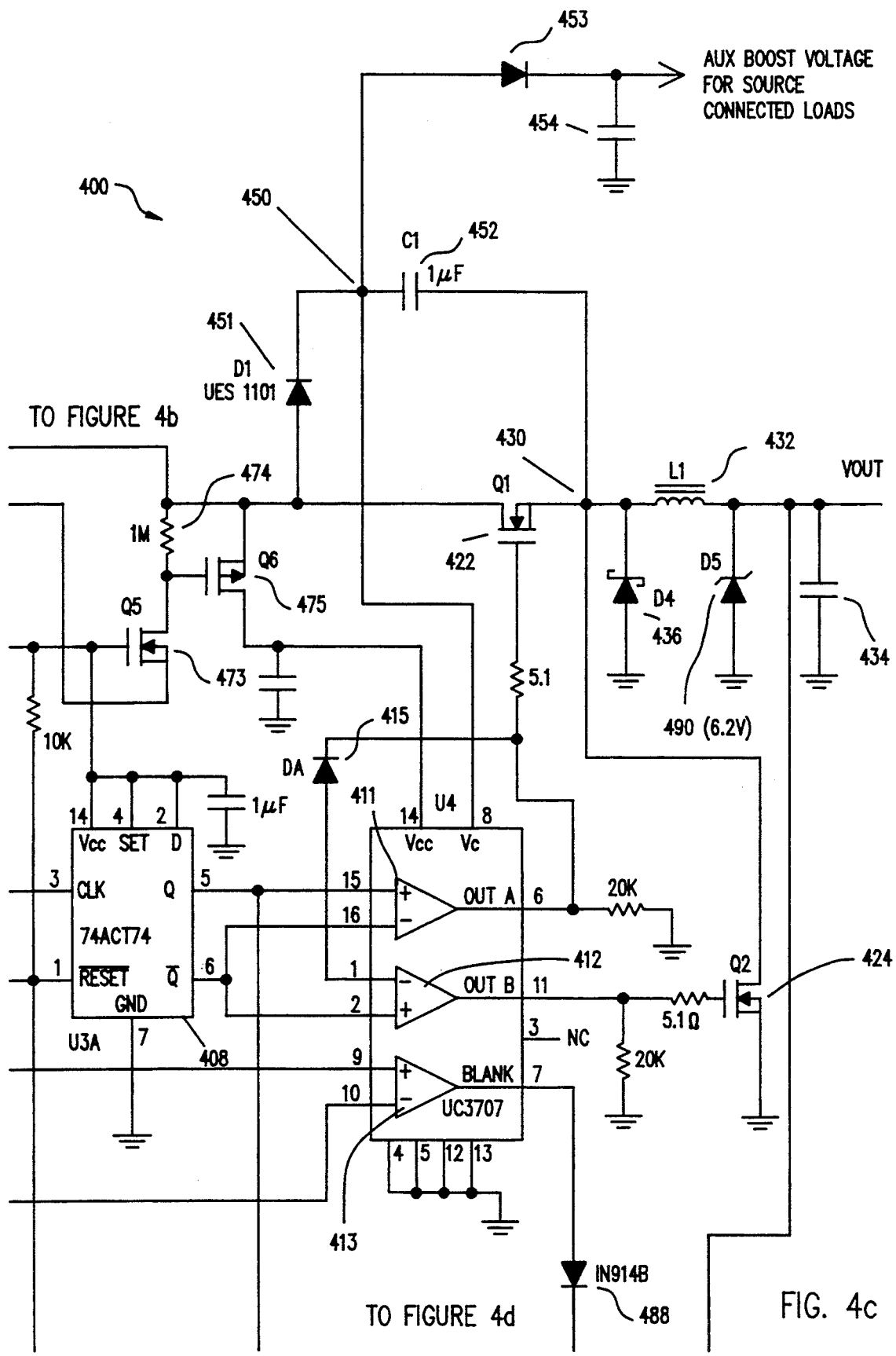
Figure 4D:
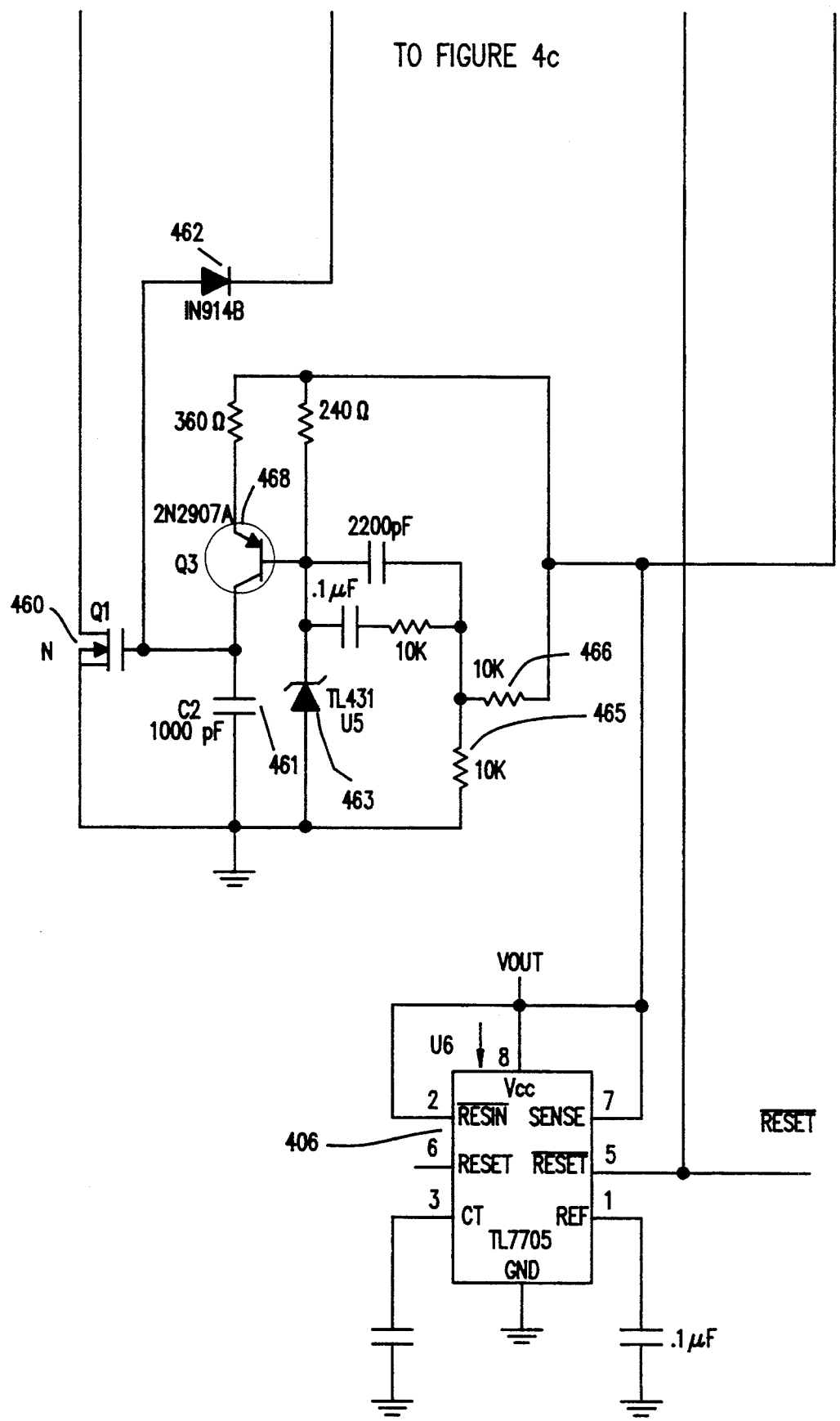

FIGS. 3B-E show more detailed portions of FIG. 3A. In particular, FIG. 3B illustrates memory expansion with optional 1 or 2 megabyte modules 316 and 314 plus DC—DC regulator (converter) 362 that takes as input power from the rechargeable battery at about 6 volts (five 1.2 volt NiCd or NiMH4 cells) and outputs 12 volts for programming Flash EEPROM 360 which contains the boot program. FIG. 3C shows LCD panel 336 and first preferred embodiment inverter 334 which provides the AC power for the backlighting of panel 336. FIG. 3D illustrates further aspects of power consumption management controller 320, and FIG. 3E shows connections to input/output controller 350 such as keyboard 380, mouse port 386, RS 232 interface 352, optional modem 354, and printer port 390. The preferred embodiment DC—DC regulator which outputs 5 volts (actually 4.8 volts may be used) to power all of the CMOS devices such as microprocessor 300, controller 310, and so forth is not explicitly shown in any of FIGS. 3A-E.

Regulator

FIG. 4 schematically shows first preferred embodiment DC—DC regulator 400. Regulator 400 basically includes an input terminal for unregulated dc input $V_{in}$ (typically supplied by a battery), an output terminal for regulated output $V_{out}$, n-channel pass FET 422 and n-channel free-wheeling FET 424, inductor 432, diode 436, and capacitor 434. To provide the switching of FETs 422 and 424 plus other features, regulator 400 includes the following components: low power, low dropout voltage regulator 402 which may be an LM2931; 555-type timer 404 which may be a TLC555; reset generator 406 which may be a TL7705; D flip-flops 408-409 which may each be a half of a 74ACT74; comparators 411-413 which may be portions of a UC3707 with comparator 413 providing blanking of the outputs of comparators 411-412; and discrete transistors, diodes, resistors, capacitors, and switches as shown in FIG. 4.

Regulator 400 can provide a $V_{out}$ of +5 volts (standard for CMOS devices) at 5 amps for an input $V_{in}$ between 5.3 volts and 25 volts, thus a battery supply for $V_{in}$ could be just five 1.2 volt recharageable NiCd or NiMH4 cells. In fact, NiCd or NiMH4 cells will vary from 1.25 volts down to close to 1.0 volt when close to 100% discharged, and typical CMOS integrated circuit operation requires a minimum power supply voltage of about 4.8 volts. Thus only five cells are needed if a low dropout voltage can be achieved. A low battery voltage such as 6 volts permits use of a more reliable and efficient battery charger than with higher voltage batteries; and the use of fewer cells in series decreases the spread of cell potentials and permits a larger number of lifetime charge-discharge cycles. Regulator 400 also provides power-fail reset (reset generator 406), electronic power switching (DPDT 471), boosted output voltage (voltage doubler diode 451, capacitor 452, diode 453 and capacitor 454) which can control battery ORing circuit, soft start, power supply for a real time clock (low power regulator 402), and a voltage feed-forward control loop. These features combine to make a small and efficient, low cost power subsystem.

Operation

Regulator 400 operates as follows. The input unregulated dc supply $V_{in}$ powers low power regulator 402 which outputs a regulated +4.5 volts. The regulated +4.5 volts provides an internal power supply Vcc for regulator 400 devices plus power for low power items such as a real time clock. Timer 404 has its threshold and trigger inputs (pins 2 and 6) connected to put it into an astable (oscillating) mode with a periodic output (at pin 3) switching between 0 and Vcc. The duty cycle of the periodic output approximates 99% and is determined by the RC time constant to charge up (from ⅓ Vcc to ⅔ Vcc) 470 pF capacitor 441 through 22 Kohm resistor 442 when the periodic output is high (duration roughly 10 microseconds) and the discharge time of capacitor 441 through diode 443 when the periodic output is low (duration roughly 100 nanoseconds). Thus the square wave periodic output of timer 404 has a frequency of roughly 100 KHz, although this can be easily changed by varying the values of resistor 442 or capacitor 441. The rising edge of this output square wave is integrated by resistor 445 and capacitor 446 (RC about 300 nanoseconds) and clocks flip-flop 408. This integration delay allows for flip-flop 408 setup time. See the waveforms of FIG. 5 where the top panel illustrates the charging and discharging of capacitor 441, the second panel shows the output of timer 404, and the third panel indicates the integrated output applied to the CLK input of flip-flop 408. The duration of the low output of timer 404 and the integration has been exaggerated for clarity.

The discharge input (pin 7) of timer 404 is active when the periodic output is low and pulls the reset input of flip-flop 408 low to reset the flip-flop. Thus when the periodic output of timer 404 switches low, the discharge input turns on and pulls the reset input of flip-flop 408 low to reset the flip-flop to the Q=0 state; then 100 nanoseconds later the periodic output of timer 404 returns high (and the discharge input inactivated) and after another 300 nanoseconds the periodic output high has been integrated to clock flip-flop 408 and set it back to Q=1 because its D input ties to Vcc. However, as described below, feedback from $V_{out}$ through FET 460 will in fact provide an earlier reset input to flip-flop 408 and shorten the duty cycle of Q as shown by the broken lines in the fourth and fifth panels of FIG. 5.

The Q and Q# (Q-bar) outputs of flip-flop 408 drive the positive and negative inputs of comparator 411, respectively, and comparator 411, in turn, drives the gate of pass FET 422. The output level of comparator 411 derives from power input Vc which connects to voltage-doubling node 450, so the gate of n-channel pass FET 422 is boosted above $V_{in}$ to eliminate the threshold drop. Note that if the $V_{in}$ input were used as the output for comparator 411, then the gate of pass FET 422 would be at most at $V_{in}$ and pass FET 422 would limit the voltage of node 430 to a threshold less than $V_{in}$ and the dropout voltage would increase.

Voltage-doubling node 450 operates as follows: when pass FET 422 is off and free-wheeling FET 424 is on, then node 430 is slightly above ground and node 450 is a diode drop below $V_{in}$. Hence, capacitor 452 is charged to about $V_{in}$ minus a diode drop. When free-wheeling FET 424 turns off and pass FET 422 turns on, node 430 jumps up to $V_{in}$, So capacitor 452 pushes node 450 up to about $2V_{in}$ minus a diode drop. Hence, when pass FET 422 turns on an extra voltage boost occurs to insure the gate voltage is well above $V_{in}$. Note that the peak voltage at node 450 turns on diode 453 and stores on capacitor 454 to provide a roughly $2V_{in}$ supply.

The Q# output of flip-flop 408 also drives the positive input of comparator 412, and the negative input connects through diode 415 to the gate of pass FET 422. Thus when Q# goes high to turn on free-wheeling FET 424, the voltage on the gate of pass FET 422 must first drop below Q# minus a diode drop and be turning off pass FET 422 before comparator 412 starts to switch high to turn on free-wheeling FET 424. This contrasts with the case of Q# and Q alone driving comparator 412. The slow turn on of FET 424 helps prevent shoot-through current from $V_{in}$ to ground which would occur if FETs 422 and 424 are both on simultaneuosly. Note that diode 436 provides the loop current path when FETs 422 and 424 are simultaneously off.

Additionally, blanking comparator 413 blanks the outputs of comparators 411 and 412 when the periodic output of timer 404 is low, as follows. The control output (pin 5) of timer 404 provides a constant ⅔ Vcc to the positive input of comparator 413 and the periodic output of timer 404 provides the negative input of comparator 413, so comparator 413 outputs short (100 nanosecond) high pulses at 100 KHz corresponding to lows in the periodic output. These pulses blank the outputs of comparators 411 and 412 by internal connections not shown in FIG. 4. This blanking insures that pass FET 422 and free-wheeling FET 424 will not be on at the same time when pass FET 422 is turning off and an earlier reset through FET 460 (see following discussion) has not occurred.

Duty Cycle Control

Once $V_{out}$ approaches its regulated value (+5 volts), feedback to provide reset of flip-flop 408 and control of the duty cycle of the Q output (and thus of pass FET 422 and free-wheeling FET 424) occurs as follows. First, when Q is low, diode 462 discharges the upper (in FIG. 4) plate of capacitor 461 to about a diode drop above ground and turns off n-channel FET 460. Then when the periodic output of timer 404 goes high and Q goes high, diode 462 releases the upper plate of capacitor 461. Secondly, resistors 465–466 divide $V_{out}$ in half and feed this to shunt voltage regulator 463 which has a (programmable) reference point of 2.5 volts. Regulator 463 will thus turn on to conduct when $V_{out}$ reaches 5 volts. The emitter and base of pnp 468 will both be at $V_{out}$ and pnp 468 will be off until regulator 463 conducts and generates a emitter base bias. When $V_{out}$ is at least +5 volts, regulator 463 conducts and turns on pnp 468 to charge up capacitor 461 if Q is high; otherwise the current from pnp 468 is shunted to ground by diode 462 if Q is low. Thus with $V_{out}$ at least +5 volts, pnp 468 begins charging up capacitor when Q switches from low to high 300 nanoseconds after the periodic output of timer 404 switches from low to high. When the voltage across capacitor 461 reaches the threshold of FET 460, the FET turns on to pull the reset input of flip-flop 408 low and drive Q low as shown by the broken lines in FIG. 5. The charge up rate of capacitor is determined by the current of pnp 468 which depends upon the emitter base bias and thus the current through shunt regulator 463. Hence, the greater the difference $V_{out}-5$, the faster capacitor 461 charges up and the smaller the duty cycle of Q; that is, Q is high for less time and low for more time. This translates into keeping pass FET 422 on for less time and free-wheeling FET on for more time in each timer period. In effect, regulator 463, pnp 468, and the resistors (plus filtering capacitors connected to the base of pnp 468) form a voltage to current converter, and the output current charges capacitor 461. And the charging rate of capacitor 461 determines the duty cycle of Q and pass FET 422. As previously noted, $V_{out}$ equals $V_{in}$ multiplied by the duty cycle of the pass FET, so the feedback stabilizes $V_{out}$ at the level determined by shunt regulator 463. Lastly, the voltage drop of pass FET 422 when driven by the voltage doubler is only about 0.1–0.2 volt even for a 5 amp current, and because timer 404 provides an output with a 99% duty cycle, $V_{out}$ will be maintained at +5 volts even when $V_{in}$ drops to 5.3 volts. That is, the dropout voltage is 0.3 volt.

For large $V_{in}$, the duty cycle of FET 422 must be small (below 20% for 27 volts at $V_{in}$) and thus the current from pnp 468 charging capacitor must be larger because most of it is shunted to ground by diode 462 when Q is low. This limits the magnitude of $V_{in}$; but the breakdown voltage of the gate oxide of FET 422 also limits $V_{in}$. In particular, up to $2V_{in}$ appears at the gate of FET 422, whereas the source is only at $V_{out}$, so up to $2V_{in}-V_{out}$ appears across the gate oxide.

Zener diode 490 provides an output crowbar to protect the load at $V_{out}$ in case pass FET 422 fails; the Zener voltage is 6.2 volts.

Power Switch

Flip-flop 409 provides a combination fault latch, low battery shutdown, and an electronic power switch. In particular, double pole double throw (DPDT) switch 471 controls the electronic switch as follows. DPDT 471 in the off position implies both the set and reset inputs of flip-flop 409 are low and the control (pin 5) of timer 404 is held low. Now, set and reset inputs of flip-flop 409 both low drives both Q and Q# high; and Q high (Vcc) turns off FET 473 whose gate is also at Vcc. Hence, no current flow means resistor 474 does not develop a voltage drop and FET 475 turns off to cut off $V_{in}$ power to comparators 411–413 and thus disable pass FET 422 and free-wheeling FET 424. Note that diode 477 holds the reset input (pin 4) of timer 404 low despite Q# of flip-flop 409 being high, and reset low interrupts the oscillation and puts timer 404 in the nontriggered state. Thus DPDT 471 in the off position turns off $V_{out}$ and limits regulator 400 to a very low power consumption: about 100 microamps.

Conversely, DPDT 471 switched into the on position forces the set and reset and data inputs of flip-flop 409 high, but the RC time constant of resistor 481 and capacitor 482 delays the reset high. Thus Q originally goes low, and this turns on FETs 473 and 474 to apply $V_{in}$ to comparators 411–413 and thereby turn on pass FET 422 to start $V_{out}$ rising. Simultaneously, capacitor 444 charges up through the internal resistor of timer 404 to its ⅔ Vcc level, and during this ramp up of the capacitor 444 voltage the internal comparator reference points are lower. Thus timer 404 will oscillate at a higher frequency due to the smaller voltage swing on capacitor 441 firing the trigger and threshold comparators. Timer 404 thus will clock flip-flop 408 at a faster rate, but the RC delay by resistor 445 and capacitor 446 does not change, so the duty cycle of Q decreases and a "soft start" powering up of $V_{out}$ occurs rather than a sudden jump in voltage. Indeed, the oscillation period of timer 404 varies roughly linearly with the charge on capacitor 444.

Reset Generator

Figure 1:
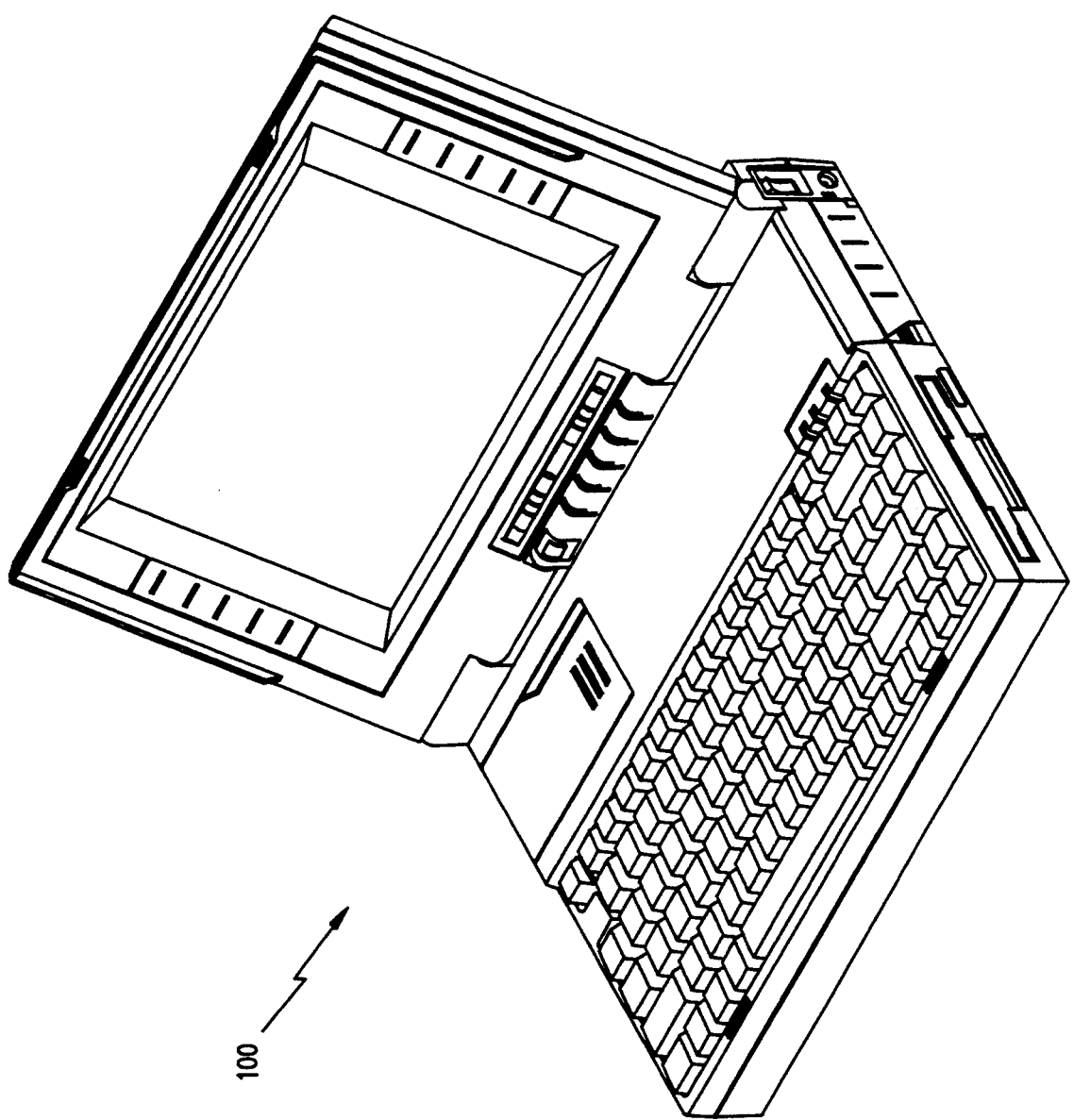
FIG. 1 perspectively illustrates a laptop computer.
Figure 2A:
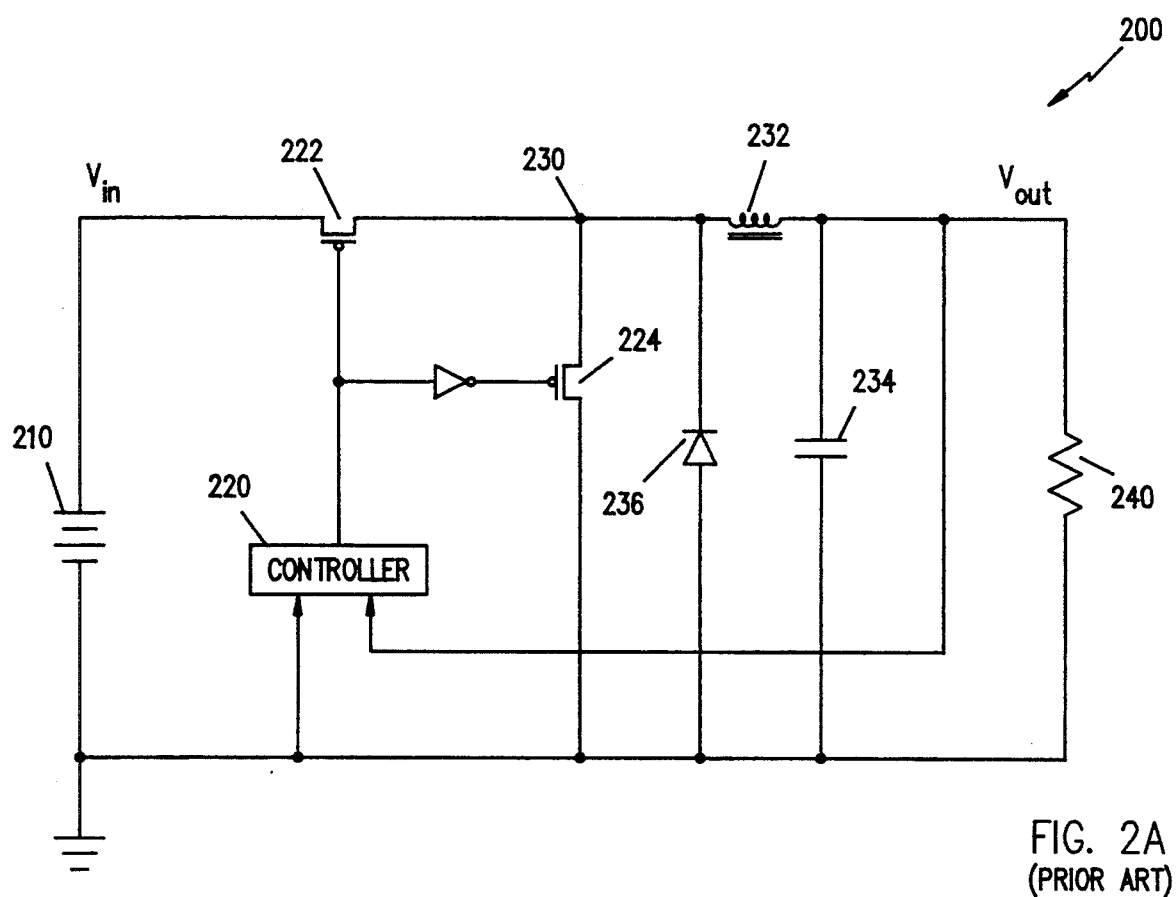
FIGS. 2A-B schematically shows a known regulator and its waveforms.
Figure 2B:
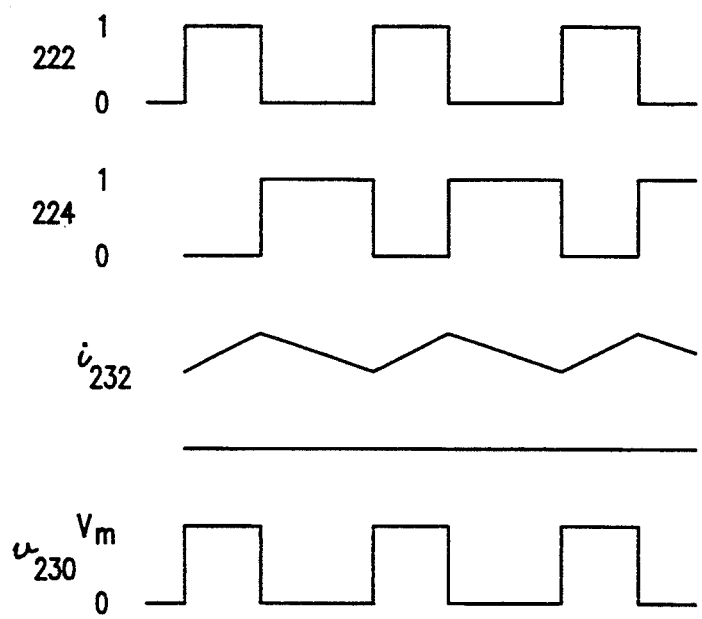

Reset generator 406 provides a reset pulse (RESET#) upon $V_{out}$ being out of tolerance. The reset pulse resets the microprocessor such as CPU 102 in FIG. 1 when power returns to an in-tolerance condiction after being in an out-of-tolerance condiction. Reset generator 406 contains an internal reference voltage (bandgap generator) with which it compares the power supply voltage $V_{out}$.

With $V_{in}$ minimally greater than $V_{out}$, and with little current being drawn by the load at $V_{out}$ (and thus little current in inductor 432), Q from flip-flop 408 and pass FET 422 will have a maximum duty cycle (99%) and the blanking by comparator 413 will effectively keep free-wheeling FET 424 always off. In such a case voltage doubler capacitor 452 will not charge and will fail to boost the gate voltage of pass FET 422 which will not saturate. To overcome such excessive blanking problem and also to let regulator 400 start up in an unloaded condition, the reset pulse from reset generator 406 suppresses the blanking by comparator 413 through diode 488. That is, free-wheeling FET 424 will turn on for a time period determined by the propagation delay of comparator 412. Such blanking suppression permits doubler capacitor 452 to charge up but also allows shoot-through current due to the overlapping conductivity of pass FET 422 and free-wheeling FET 424. However, doubler capacitor 452 typically takes less than 500 milliseconds to charge up, and the shoot-through current during the overlaps of FET 422 and FET 424 conductivity for such a short interval can be tolerated.

The dropout voltage depends upon the voltage drop in saturated pass FET 422 plus the voltage drop in inductor 432. The voltage drop in pass FET 422 will be small due to the boosted gate voltage, and the voltage drop in inductor 432 depends upon the current and the resistance of the windings. Now the resistance of the windings is proportinoal to the inductance, and a lower inductance can be used with a higher frequency of oscillation by timer 404. But as oscillation frequency increases, switching losses increase. Also, as the average current drops, intervals of zero current in inductor 432 will occur and make the necessary duty cycle depend upon output current, so a minimum current is needed to avoid a output current dependence. But regulator 400 is to fit on a circuit board within a portable computer, so the overall physical size has limits, and thus inductor 432 cannot be made of arbitrarily heavy wire. An overall size of about 1 square inch (using surface mount chips for the integrated circuits) and an oscillation frequency of about 80 KHz leads to an inductor resistance of about 50 to 100 milliohms. Thus the inductor resistance dominates the approximate 10 milliohm on-resistance of pass FET 422 and determines the dropout voltage.

Waveforms

Figure 5:
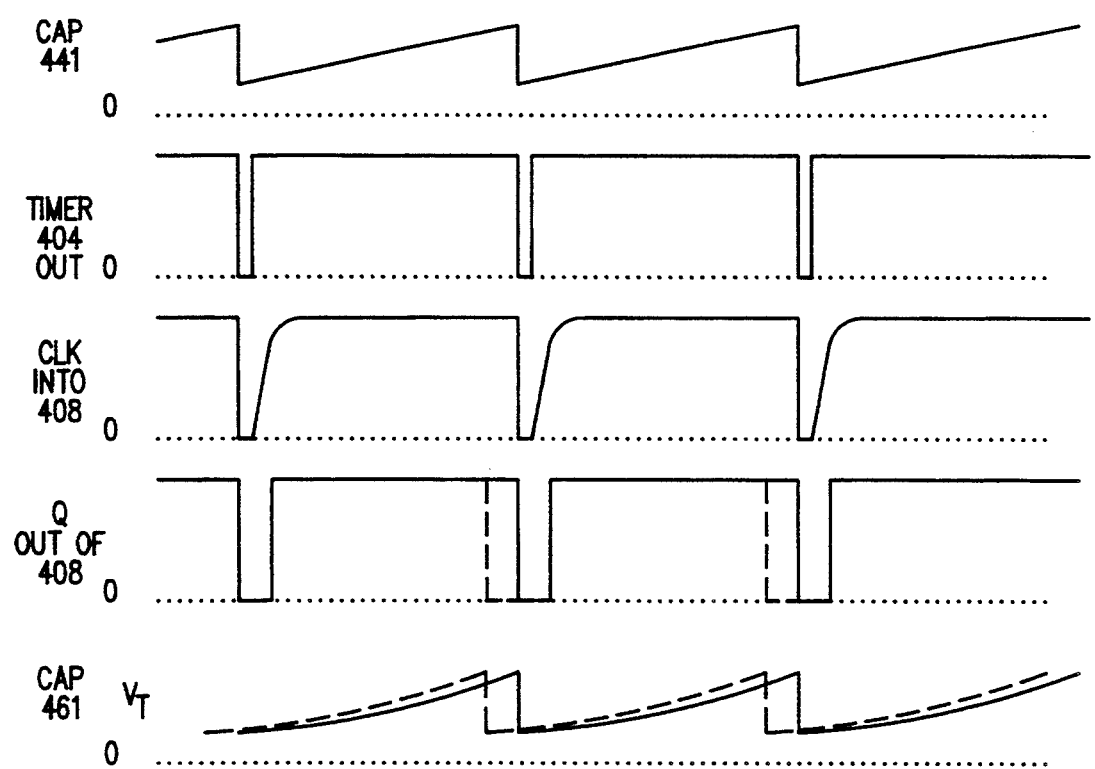
FIG. 5 shows waveforms.
Figure 6A:
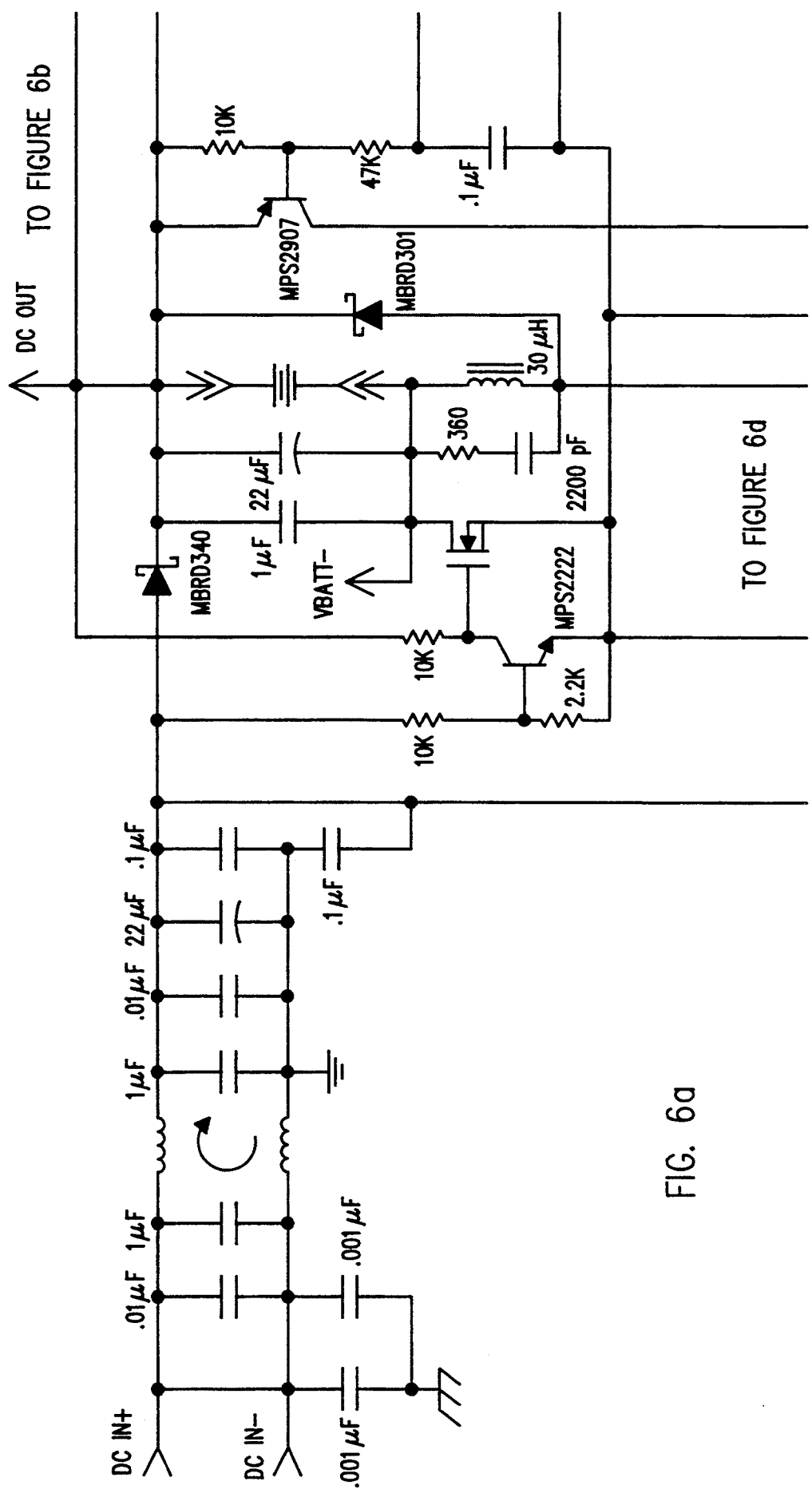
FIG. 6 shows another preferred embodiment.
Figure 6B:
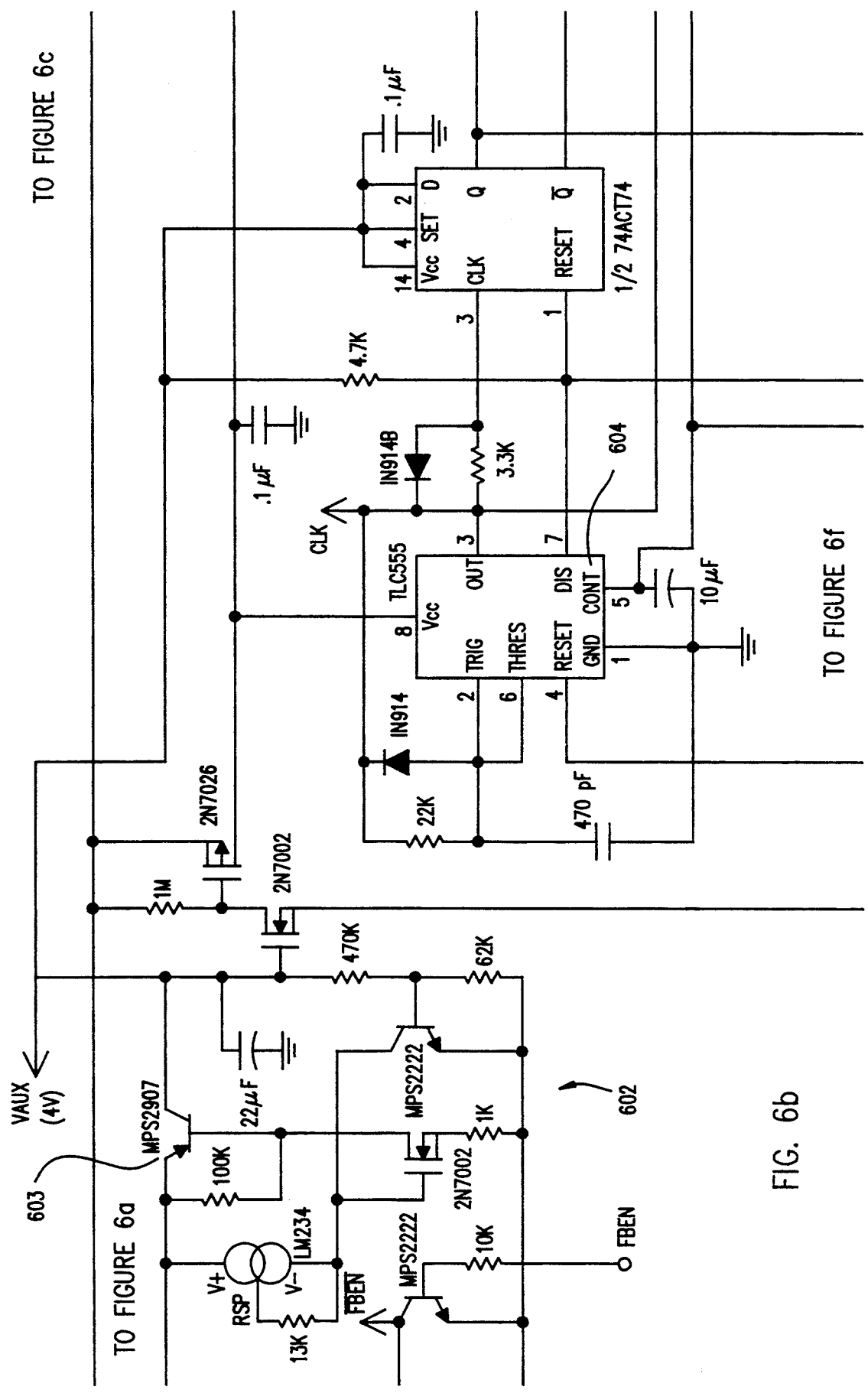
Figure 6C:
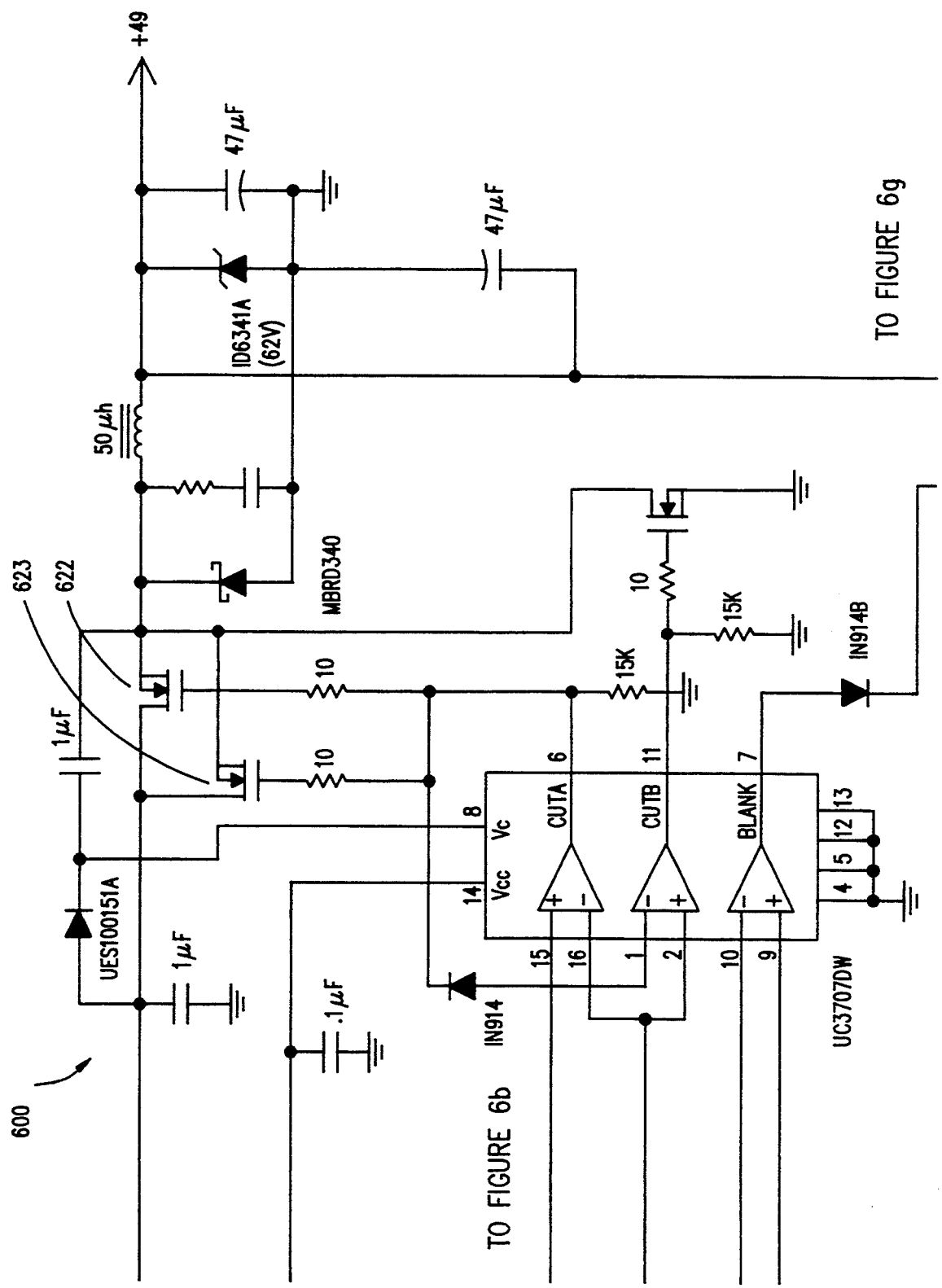
Figure 6D:
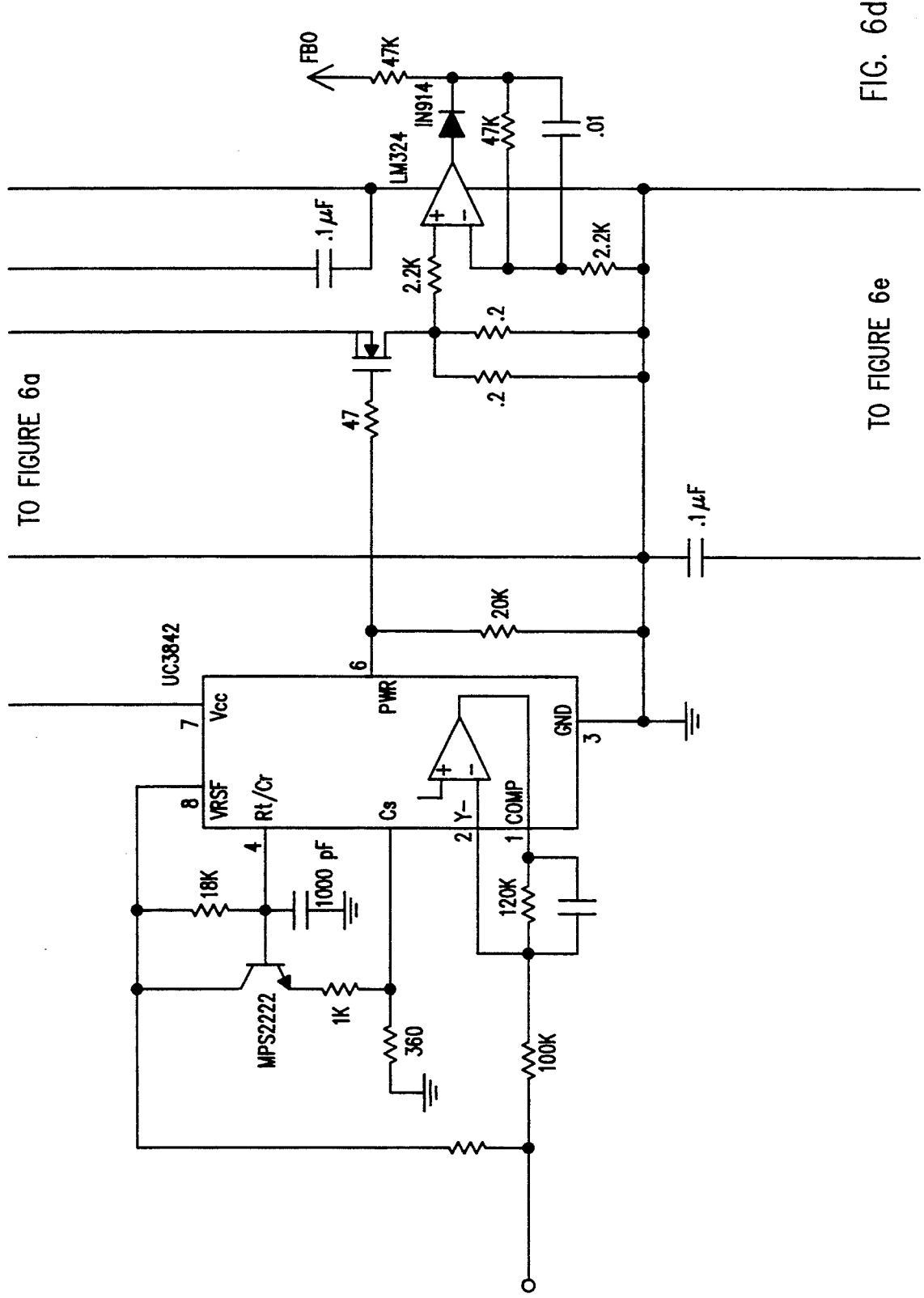
Figure 6E:
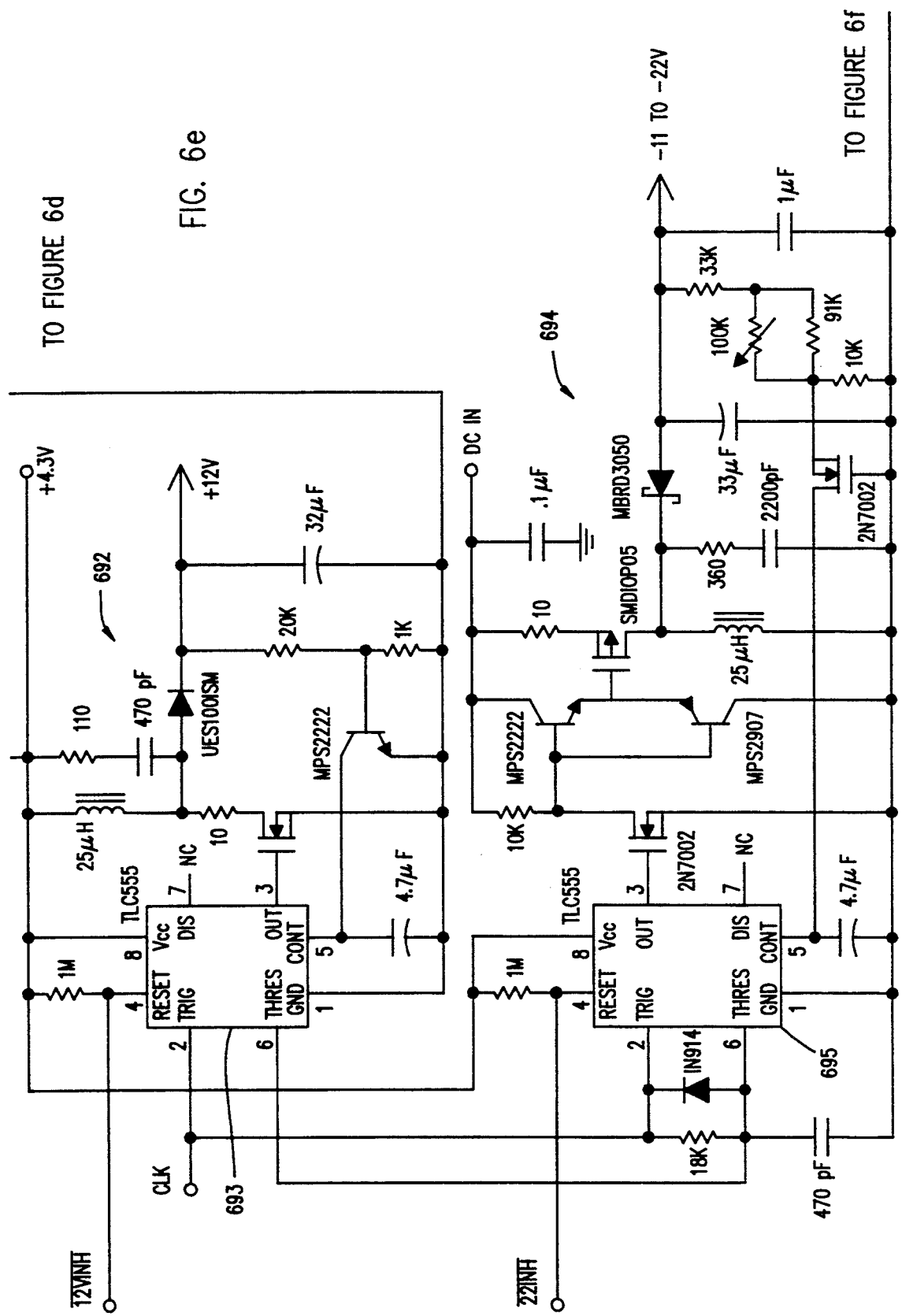
Figure 6F:
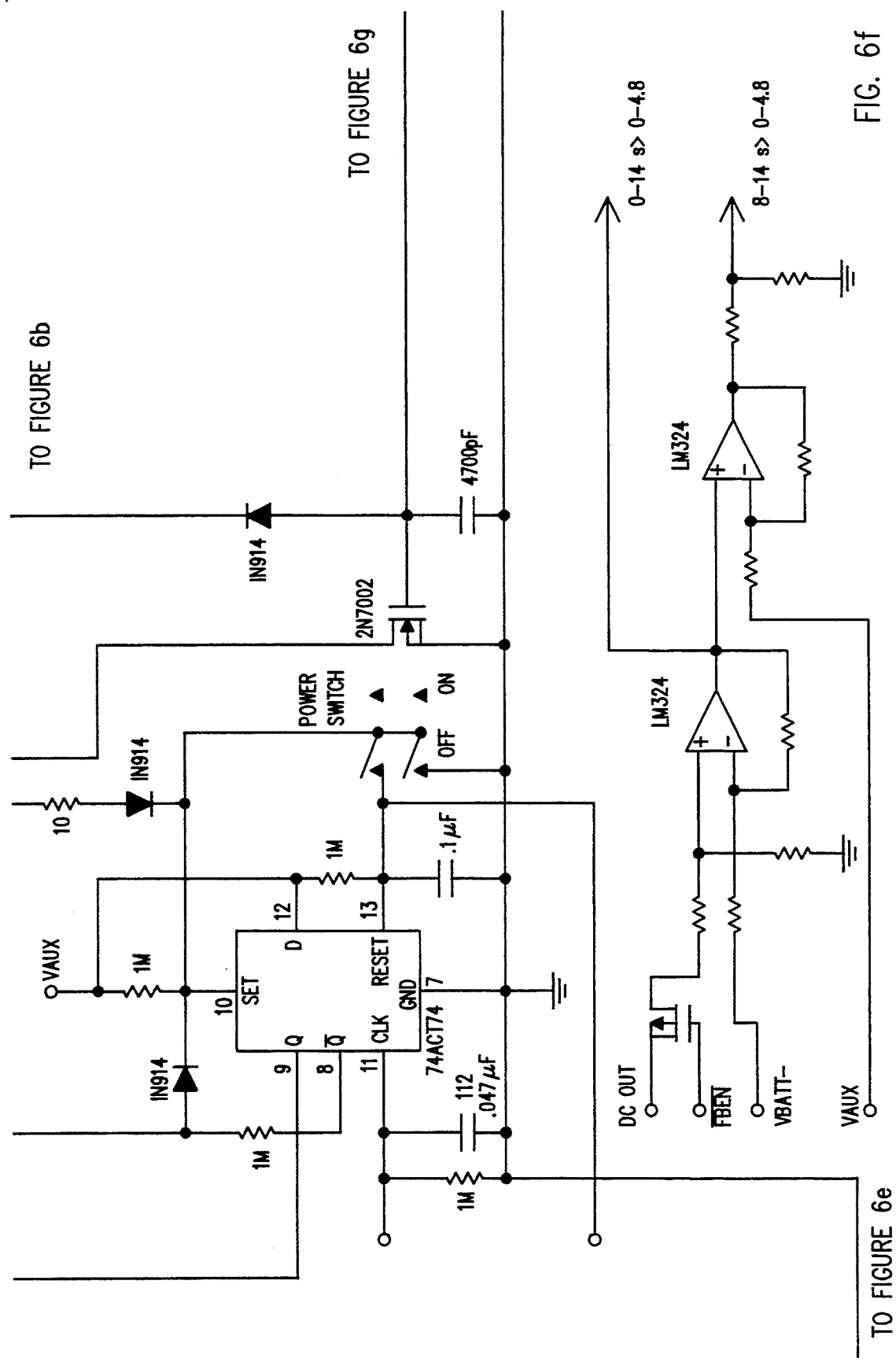
Figure 6G:
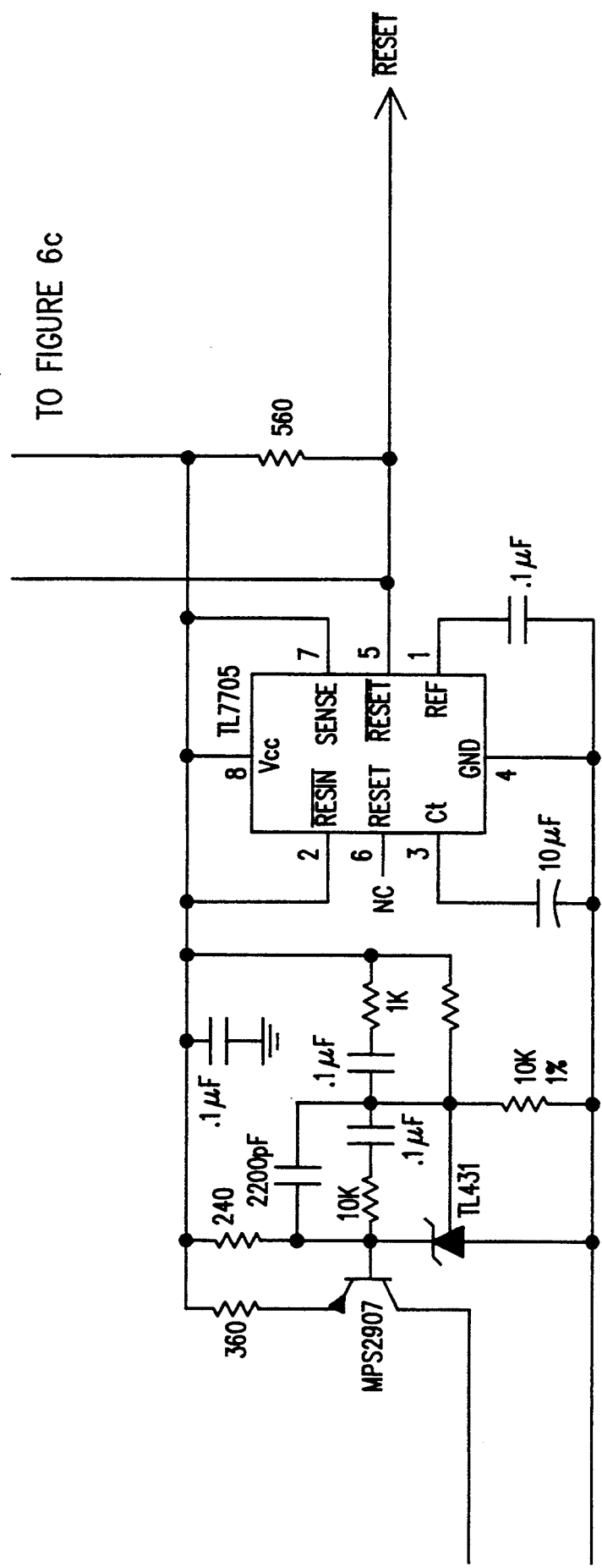

FIG. 5 illustrates the voltage waveforms observed in inverter 300. The first panel shows the voltage ramp on trigger capacitor 441 of timer 404; the ramp rate depends upon the resistor 442 and capacitor 441 values. The second panel shows the periodic output of timer 404 at pin 3; this amounts to a series of low spikes. The third panel indicates the CLK input of flip-flop 408 which is the pin 3 output of timer 404 after passing the integrator made of resistor 445 and capacitor 446; the duration of the low has been exaggerated for clarity. The Q output flip-flop 408 appears in the fourth panel with the pass FET 422 duty cycle variation due to earlier resets of flip-flop 408 by feedback driving FET 460 indicated by the broken line. The last panel shows the variation in charging rate of capacitor 461 that comes from the feedback and determines the driving of FET 460 and the duty cycle.

Further Modifications and Variations

The preferred embodiments may be modified in many ways while retaining one of more of the features of an adaptive synchronous rectifier.

For example, FIG. 6 shows a variant regulator in combination with other power supply circuits. In particular, the righthand portion of FIG. 6 shows a regulator 600 similar to regulator 400 but with low power regulator 602 explicitly shown (this regulator employs the pnp 603 with feedback for regulation). Also, regulator 600 has two pass FETs 622–623 in parallel to lessen the dropout voltage. The lefthand portion of FIG. 6 shows +12 volt regulator 692 and −11 to −22 volt inverting regulator 694. Regulator 692 has timer 693 directly switching its pass FET, and regulator 694 has timer 695 directly switching its pass FET; and timers 693 and 695 are synchronized to timer 604 by the output (pin 3) of timer 604 driving the trigger inputs of timers 693 and 695. This synchrony limits the noise spectrum of the regulator combination. The feedback duty cycle control of regulators 692 and 694 relies on sampling the output voltages and coupling the sampled voltages to the control input (pin 5) of the corresponding timer.

What is claimed is:

1. A regulator, comprising:
   (a) a power input terminal;
   (b) a regulated power output terminal;
   (c) an inductor and a pass switch in series between said input terminal and said output terminal, said inductor directly connected to said output terminal and said pass switch connected to said input terminal;
   (d) a free-wheeling switch connecting said inductor and pass switch to ground;
   (e) switch control circuitry with outputs connected to control inputs of said pass switch and said free-wheeling switch, said control circuitry including a feedback from control input of said pass switch to delay turn-on said free-wheeling switch until said pass-switch has been turned off;
   (f) said pass switch includes a first field effect transistor;
   (g) said free-wheeling switch includes a second field effect transistor; and
   (h) said feedback includes a diode coupled from a driver for the gate of said second transistor to the gate of said first transistor.

2. The regulator of claim 1, wherein:
   (a) said free-wheeling switch includes a diode in parallel with said second transistor.

3. The regulator of claim 1, wherein:
   (a) said control circuitry includes a voltage-to-current converter coupled from said output terminal to a capacitor;
   (b) wherein the voltage on said capacitor triggers said switches to switch;
   (c) said control circuitry further includes a pulse generator and a flip-flop with the output of said pulse generator clocking said flip-flop and with said voltage on said capacitor coupled to reset said flip-flop; and
   (d) wherein the output of said flip-flop couples to control inputs of said switches.

4. The regulator of claim 3, wherein:
   (a) said pulse generator is a timer circuit in astable connection.

5. The regulator of claim 3, wherein:
   (a) said control circuitry includes first and second comparators with the output of said first comparator coupled to the control input of said pass switch and the output of said second comparator coupled to the control input of said free-wheeling switch, said first comparator with inputs from said flip-flop and said second comparator with inputs from said flip-flop and the output of said first comparator.

6. The regulator of claim 5, wherein:
   (a) said pass switch includes a first field effect transistor;
   (b) said free-wheeling switch includes a second field effect transistor;
   (c) said control inputs are the gates of said field effect transistors; and
   (d) said feedback includes a diode coupled from said input of said second comparator to the gate of said first transistor.

7. A power supply system, comprising:
   (a) a first regulator including:
      (i) a first power input terminal;
      (ii) a first regulated power output terminal;
      (iii) a first inductor and a first pass switch in series between said first input terminal and said first output terminal, said first inductor directly connected to said first output terminal and said first pass switch connected to said first input terminal;
      (iv) a first free-wheeling switch connecting said first inductor and said first pass switch to ground;
      (v) first switch control circuitry with outputs connected to control inputs of said first pass switch and said first free-wheeling switch, said control circuitry including a feedback from said control input of said first pass switch to delay turn-on said first free-wheeling switch until said first pass-switch has been turned off;
   (b) a second regulator including:
      (i) a second power input terminal;
      (ii) a second regulated power output terminal;
      (iii) a second pass switch connected to said second power input terminal and coupled to said second power output terminal;
      (iv) second switch control circuitry with outputs connected to control inputs of said second pass switch, said second control circuitry synchronized by said first control circuitry;
   (c) said first, second and third transistors are n-channel and
   (d) said first switch control circuitry includes a voltage doubler with output coupled to the gates of said first and third transistors.

8. The system in claim 7, wherein:
(a) said first free-wheeling switch includes a diode in parallel with said second transistor.

9. The system of claim 7, wherein:
(a) said first control circuitry includes a voltage-to-current converter coupled from said output terminal to a capacitor;
(b) wherein the voltage on said capacitor triggers said first pass and first free-wheeling switches to switch;
(c) said first control circuitry further includes a pulse generator and a flip-flop with the output of said pulse generator clocking said flip-flop and with said voltage on said capacitor coupled to reset said flip-flop; and
(d) wherein the output of said flip-flop couples to control inputs of said first pass and first free-wheeling switches.

10. The system of claim 9, wherein:
(a) said pulse generator is a first timer in astable connection; and
(b) said second control circuitry includes a second timer triggered by said first timer.

11. The system of claim 9, wherein:
(a) said first control circuitry includes first and second comparators with the output of said first comparator coupled to the control input of said first pass switch and the output of said second comparator coupled to the control input of said first free-wheeling switch, said first comparator with inputs from said flip-flop and said second comparator with inputs from said flip-flop and the output of said first comparator.

12. A power supply system, comprising:
(a) a first regulator including:
  (i) a first power input terminal;
  (ii) a first regulated power output terminal;
  (iii) a first inductor and a first pass switch in series between said first input terminal and said first output terminal, said first inductor directly connected to said first output terminal and said first pass switch connected to said first input terminal;
  (iv) a first free-wheeling switch connecting said first inductor and said first pass switch to ground;
  (v) first switch control circuitry with outputs connected to control inputs of said first pass switch and said first free-wheeling switch, said control circuitry including a feedback from said control input of said first pass switch to delay turn-on said first free-wheeling switch until said first pass-switch has been turned off;
(b) a second regulator including:
  (i) a second power input terminal;
  (ii) a second regulated power output terminal;
  (iii) a second pass switch connected to said second power input terminal and coupled to said second power output terminal;
  (iv) second switch control circuitry with outputs connected to control inputs of said second pass switch, said second control circuitry synchronized by said first control circuitry;
(c) said first pass switch includes a first field effect transistor;
(d) said second pass switch includes a second field effect transistor;
(e) said first free-wheeling switch includes a third field effect transistor;
(f) said control inputs are the gates of said field effect transistors; and
(g) said feedback includes a diode coupled from a driver for the gate of said third transistor to the gate of said first transistor.

13. The system of claim 12, wherein:
(a) said first free-wheeling switch includes a diode in parallel with said second transistor.

14. The system of claim 12, wherein:
(a) said first control circuitry includes a voltage-to-current converter coupled from said output terminal to a capacitor;
(b) wherein the voltage on said capacitor triggers said first pass and first free-wheeling switches to switch;
(c) said first control circuitry further includes a pulse generator and a flip-flop with the output of said pulse generator clocking said flip-flop and with said voltage on said capacitor coupled to reset said flip-flop; and
(d) wherein the output of said flip-flop couples to control inputs of said first pass and first free-wheeling switches.

15. The system of claim 14, wherein:
(a) said first control circuitry includes first and second comparators with the output of said first comparator coupled to the control input of said first pass switch and the output of said second comparator coupled to the control input of said first free-wheeling switch, said first comparator with inputs from said flip-flop and said second comparator with inputs from said flip-flop and the output of said first comparator.

16. The system of claim 14, wherein:
(a) said pulse generator is a first timer in astable connection; and
(b) said second control circuitry includes a second timer triggered by said first timer.

17. A regulator, comprising:
(a) a power input terminal;
(b) a regulated power output terminal;
(c) an inductor and a pass switch in series between said input terminal and said output terminal, said inductor directly connected to said output terminal and said pass switch connected to said input terminal;
(d) a free-wheeling switch connecting said inductor and pass switch to ground;
(e) switch control circuitry with outputs connected to control inputs of said pass switch and said free-wheeling switch, said control circuitry including a feedback from said control input of said pass switch to delay turn-on said free-wheeling switch until said pass-switch has been turned off;
(f) said first and second transistors are n-channel; and
(g) said switch control circuitry includes a voltage doubler with output coupled to the gates of said first and second transistors.

18. The regulator of claim 17, wherein:
(a) said free-wheeling switch includes a diode in parallel with said second transistor.

19. The regulator of claim 17, wherein:
(a) said control circuitry includes a voltage-to-current converter coupled from said output terminal to a capacitor;
(b) wherein the voltage on said capacitor triggers said switches to switch;
(c) said control circuitry further includes a pulse generator and a flip-flop with the output of said pulse generator clocking said flip-flop and with said voltage on said capacitor coupled to reset said flip-flop; and (d) wherein the output of said flip-flop couples to control inputs of said switches.

20. The regulator of claim 19, wherein:

(a) said pulse generator is a timer circuit in astable connection.

21. The regulator of claim 19, wherein:

(a) said control circuitry includes first and second comparators with the output of said first comparator coupled to the control input of said pass switch and the output of said second comparator coupled to the control input of said free-wheeling switch, said first comparator with inputs from said flip-flop and said second comparator with inputs from said flip-flop and the output of said first comparator.

22. The regulator of claim 21, wherein:

(a) said pass switch includes a first field effect transistor;

(b) said free-wheeling switch includes a second field effect transistor;

(c) said control inputs are the gates of said field effect transistors; and (d) said feedback includes a diode coupled from said input of said second comparator to the gate of said first transistor.

* * * * *